United States Patent [19]

Pine

[11] 4,148,750

[45] Apr. 10, 1979

[54] REDISPERSION OF NOBLE METALS ON SUPPORTED CATALYSTS

[75] Inventor: Lloyd A. Pine, Greenwell Springs, La.

[73] Assignee: Exxon Research & Engineering Co., Florham Park, N.J.

[21] Appl. No.: 758,070

[22] Filed: Jan. 10, 1977

[51] Int. Cl.$^2$ .................... B01J 29/38; B01J 29/12; B01J 29/32; L10G 13/10
[52] U.S. Cl. .................................. 252/416; 208/111; 252/412; 252/413; 252/455 Z
[58] Field of Search ........... 252/412, 413, 415, 455 Z, 252/416; 208/111, 120

[56] References Cited

U.S. PATENT DOCUMENTS

| 3,684,738 | 8/1972 | Chem | 252/412 |
|---|---|---|---|
| 3,692,692 | 9/1972 | Ward et al. | 252/412 |
| 3,849,293 | 11/1974 | Ward | 252/411 R |
| 3,899,441 | 8/1975 | Hansford | 252/412 |

*Primary Examiner*—Winston A. Douglas
*Assistant Examiner*—P. E. Konopka
*Attorney, Agent, or Firm*—John W. Ditsler

[57] ABSTRACT

Noble metals on supported zeolite-containing hydrocarbon conversion catalysts, which have been at least partially damaged by thermal and/or hydrothermal stresses resulting in a maldistribution of the supported metal, are redispersed to a highly active, high surface area state by contacting said catalyst with ethylenediaminetetraacetic acid (EDTA), or a salt thereof, to the point of incipient wetness and then removing said acid by heat treatment.

15 Claims, No Drawings

REDISPERSION OF NOBLE METALS ON SUPPORTED CATALYSTS

BACKGROUND OF THE INVENTION

1. Field of the Invention

The present invention relates to the redispersion of metals on supported zeolite-containing hydrocarbon conversion catalysts. More particularly, this invention relates to a process for the redispersion of noble metals on supported zeolite-containing hydrocarbon conversion catalysts on which said metals have become maldistributed due to exposure to excessive heat and/or steam.

2. Description of the Prior Art

Crystalline aluminosilicate zeolites, which are commonly referred to as "molecular sieves", are now well known in the art. They are characterized by their highly ordered crystalline structure and uniformly dimensioned pores, and are distinguishable from each other on the basis of composition, crystalline structure, adsorption properties and the like. The term "molecular sieves" is derived from the ability of these zeolite materials to selectively adsorb molecules on the basis of their size and form. Various types of molecular sieves may be classified according to the size of the molecules which will be rejected (i.e. not adsorbed) by a particular sieve. A number of these zeolite materials are described, for example, in U.S. Pat. Nos. 3,013,982–86, wherein they are characterized by their compositions and X-ray diffraction characteristics. In addition to their extensive use as adsorbents for hydrocarbon separation processes and the like, it has been found that crystalline aluminosilicate zeolites, particularly after cation exchange to reduce their initial alkali metal oxide content, are valuable catalytic materials for various processes, particularly hydrocarbon conversion processes. The ion exchange of these crystalline aluminosilicate zeolites with various metals and metal ions is described, for example, in U.S. Pat. Nos. 2,971,904 and Re. 26,188.

In general, the chemical formula of the anhydrous form of the crystalline aluminosilicate zeolite, expressed in terms of mole ratios of oxides, may be represented as:

$$0.9 \pm 0.2 \frac{M_2O}{n} : Al_2O_3 : X\ SiO_2$$

wherein "M" is selected from the group consisting of hydrogen, monvalent, divalent and tribalent metal cations and mixtures thereof; "n" is its valence, and "X" is a number from about 1.5 to about 12, said value dependent upon the particular type of zeolite. The zeolite, as synthetically produced or found naturally, normally contains an alkali metal such as sodium or an alkaline earth metal such as calcium. Among the well-known naturally occurring zeolites are mordenite, faujasite, chabazite, gmelinite, analcine, erionite, etc. Such zeolites differ in structure, composition, and particularly in the ratio of silica to alumina contained in the crystal lattice structure. Similarly, the various types of synthetic crystalline zeolites, e.g. synthetic faujasite, mordenite, erionite, etc. will also have varying silica-to-alumina ratios depending upon such variables as the composition of the crystallization mixture reaction conditions, etc. Silica-to-alumina ratios higher than 12, e.g., as high as 90 to 100, can also be achieved through various methods for the removal of alumina from the crystal structure of the zeolites. Such zeolites having these higher silica-to-alumina mole ratios are preferred in hydrocarbon conversion processes because of their high stability at elevated temperatures. Those silica-to-alumina ratios above three are particularly preferred.

For use in many commerical operations, e.g. moving or fluidized bed, adsorption or hydrocarbon conversion processes, the difficulty of handling the extremely fine size zeolite crystals has required the use of various "matrices" in conjunction with the zeolites. The use of such matrices is described in U.S. Pat. Nos. 3,140,249 and 3,140,253. The matrix may include various organic and/or inorganic compositions, particularly inorganic oxide gel compositions, including plural gel compositions containing a major amount of silica in conjunction with one or more metal oxides selected from Groups I-B through VIII of the Periodic Table, particularly such compounds as alumina, magnesia, zirconia, titania, etc. The matrix may also include such compositions as clay materials, particularly kaolin-type clays.

Recently such crystalline aluminosilicate zeolite-containing hydrocarbon conversion catalysts of greatly improved stability have been discovered which contain reduced amounts of alkali metal, such as less than 3 wt. %, and preferably less than 1 wt. %, e.g., preferably in the range of between 0.01 to 1 wt. %, more preferably between 0.05 to 1 wt. % (see U.S. Pat. No. 3,449,070).

In the case of dual-function catalysts (such as those used in hydrocracking and isomerization processes), it is desirable to maintain an active hydrogenating site wherein the metals are well dispersed closely adjacent to an acid cracking site in the zeolitic structure.

Typically, such crystalline aluminosilicate zeolite-containing catalysts are utilized in hydrocarbon conversion reactions at various temperatures, generally ranging from about 200° to 1000° F., depending on the particular reaction desired, and utilizing various hydrocarbon-containing feedstreams, such as light virgin naphtha, heavy gas oil, catalytic cycle stock, heavy reformate, coker gas oil, etc. In general, these reactions are conducted at pressures of from about atmospheric to 2200 psig. During such reactions, the zeolite-containing catalysts tend to become deactivated, and are generally cyclically regenerated by high-temperature treatment with an oxygen-containing gas in order to burn-off accumulated carbon and to restore some of their lost activity.

It is well known that the maldistribution of the metals on a supported zeolite-containing hydrocarbon conversion catalyst may result from long term exposure to process conditions which may be aggravated by overheating or contact with excessive partial pressures of water vapor at high temperatures, such may also occur during the oxidative regeneration of the catalyst mentioned above. Under particularly severe conditions, this may result in agglomeration of the metal into large crystallites, e.g. crystallites ranging in size from about 100–200 Å or more in diameter.

Various techniques have been suggested to obtain metals redispersion on a hydrocarbon conversion catalyst. One involves contacting a catalyst containing a Group VIII non-noble metal or compound with an aqueous acid solution (see U.S. Pat. Nos. 3,235,486 and 3,256,205). However, this technique, although useful for redispersing non-noble metals on an amorphous support, is not, in general, suitable for redispersing noble metals on zeolite-containing catalysts in that the acid and conditions employed to obtain solubility of the metal are so severe as to cause substantial damage to the crystalline portion of the zeolite. Another method involves rejuvenating siliceous zeolite catalysts comprising zeolitic mono- and/or divalent metal cations and a Group VIII metal hydrogenating component supported thereon by a sequential treatment with an aqueous ammonium salt to exchange out at least a portion of the zeolitic mono- and/or divalent metal ions, and with aqueous ammonia to effect a redistribution of the Group VIII metal (see U.S. Pat. Nos. 3,835,028 and 3,899,441).

However, none of the prior art references suggests redispersing noble metals on a supported zeolite-containing hydrocarbon conversion catalyst using EDTA and/or its salts.

SUMMARY OF THE INVENTION

Now according to the present invention it has been discovered that metals maldistribution, i.e. metal agglomeration, on supported catalysts resulting from thermal and/or hydrothermal stresses encountered by the catalyst in normal use, regeneration or during accidental upsets involving uncontrolled temperatures and/or water vapor partial pressures, may be corrected by contacting the catalyst with ethylenediaminetetraacetic acid (EDTA) or a salt thereof to incipient wetness. The EDTA or its salt dissolves the agglomerates associated with the metal maldistribution, but since the catalyst is treated to only incipient wetness, the metal is not leached from the support. In addition, the EDTA or its salt does not attack the support. The thus-treated catalyst is then dried and calcined such that the EDTA or salt thereof is removed therefrom and the metal is left in a finely divided, i.e. redispersed, state. Ammonium and alkyl ammonium salts of EDTA are preferred.

DETAILED DESCRIPTION OF THE INVENTION

In general, hydrocarbon conversion catalysts referred to herein, prior to any deactivation, i.e. prior to any use in hydrocarbon conversion processes, are crystalline aluminosilicate zeolite-containing catalysts. That is, they are hydrocarbon conversion catalysts which contain at least a minor amount of a crystalline aluminosilicate zeolite which has been so treated as to make it useful for the conversion of hydrocarbons.

The crystalline aluminosilicate zeolite component of these catalysts may be any one or more of any of those zeolites encompassed by the general formula set forth above. The zeolite component may be prepared by any of the methods known in the prior art. The preferred zeolite components will be those having a high silica-to-alumina mole ratio, i.e., those having a silica-to-alumina mole ratio greater than about 3. This will include both synthetic and natural faujasite and mordenite. In general, crystalline zeolites having uniform pore openings ranging from 6 to about 15 Angstroms will be used in the catalysts of this invention; however, the use of smaller pore-size zeolites is also comtemplated, such as zeolites having uniform pores of about 5 Angstroms. For use as a hydrocarbon conversion catalyst, it is usually necessary to reduce the alkali metal content of the crystaline alumino-silicate zeolites to less than about 10 wt. %, preferably less than about 5 wt. %, more preferably from about 1 to 3 wt. %, since alkali metal oxides are normally undesirable catalyst components for the desired hydrocarbon conversion reactions. In the case of low alkali metal catalysts, the alkali metal content is typically less than 1 wt. % and preferably between 0.05 and 1 wt. %. This required reduction may be accomplished by exchange with any one or more of the cations of metals selected from Groups I-B through Group VIII of the Periodic Table of the Elements, as well as hydrogen cations and hydrogen precursors capable of conversion to hydrogen cations, such as ammonium ions, etc. The preferred cations are those selected from the group consisting of rare earth metals, calcium, magnesium, hydrogen, ammonium, etc. It will, however, be appreciated that mixtures of these and other ions may be utilized, the basic prerequisite being that the initial hydrocarbon conversion catalyst contain at least a minor proportion of the crystalline aluminosilicate zeolite component, which zeolite component has further had its alkali metal content reduced by exchange with one or more of these other ions.

These catalysts will generally contain between about 20 and 90 wt. % crystalline aluminosilicate zeolite, and preferably from 50 to 80 wt. % zeolite. In addition to the zeolite component, these catalysts may be embedded in, or admixed with, a matrix containing the aforedescribed porous materials, particularly inorganic oxide gels. The most preferred inorganic oxide gel component will be alumina. In addition, the matrix may include a clay material, and preferably from 0 to 20 wt. % kaolin. Also combinations of these materials are also desirable in these catalyst compositions. In general, however, a variety of other materials, some possessing catalytic activity of their own, and some merely acting in an inert manner, may be employed, including such materials as silica-alumina, silica, halloysite, etc.

For use in hydrocarbon conversion processes, the crystalline aluminosilicate zeolite-containing catalyst tends to become deactivated after prolonged contact with the hydrocarbon feedstock, basically due to the buildup of carbon on the zeolite. Therefore, generally these zeolite-containing catalysts are periodically regenerated. The regeneration is typically accomplished by subjecting these catalysts to an oxygen-containing gas at high temperatures of from about 700° to 1100° F. in order to burn off these carbon deposits. If the regeneration is not preformed properly, the metals contained on the catalyst may agglomerate such that redispersion of the catalyst becomes necessary. In addition, iron scale (e.g., a corrosion product) may be deposited on the exterior of the catalyst.

According to the present invention, redispersion of agglomerated metals on a supported zeolite-containing hydrocarbon conversion catalyst to a high surface area state may be effected by contacting said catalyst with EDTA or a salt thereof. The particular manner in which the metal becomes agglomerated is not important to the present invention as long as at least a portion of the metal is agglomerated. Suitable salts include Group I salts, ammonium salts or alkyl ammonium salts (e.g. methylamines, ethyl amines, diamines, etc.) of EDTA. Suitable Group I salts include Group I metals on the Periodic Table (e.g. lithium, sodium, potassium, etc.) that do not interfere with the activity of the catalyst for the particular hydrocarbon conversion process. Ammonium and alkyl ammonium salts of EDTA are preferred.

It is preferred, although not necessary to the present invention, that the coke be removed from the catalyst prior to treatment with EDTA, i.e., the catalyst be regenerated. This enables better adsorption of EDTA since a larger pore volume is available after the coke removal. In addition, regeneration places the metal in other than the metallic state (e.g. an oxide). In some cases, this may be necessary to effect redispersion since EDTA will not dissolve noble metals.

Basically there are two criteria for applying this invention to any particular catalyst. First the EDTA or its salt must be able to dissolve the catalytic agent or material that is to be redispersed. This criteria is met with most metal oxides or sulfides as EDTA is a powerful complexing agent. Second, the formation constant of the metal EDTA complex must be greater than that between EDTA and the support. Thus, if alumina is the support, any metal with a formation constant greater than aluminum ion (about 16.1) could be redispersed without EDTA attacking the alumina. A listing of formation constants of metal EDTA complexes is shown in Welcher, F. J., the Analytical Uses of Ethylenediaminetetraacetic Acid, p. 7, D. Van Nostrand Co., New York (1958), the disclosures all of which are incorporated herein by reference.

Should iron, e.g. particles of iron scale be present on the catalyst, it is desirable to effect the removal of same (e.g. by a water wash) since iron has a high formation constant (about 25.1) and would not only consume additional EDTA but would also be redispersed along with the noble metal. In some cases, this would adversely affect the catalyst activity.

The amount of EDTA employed in the treating solution, i.e. the concentration of EDTA, is at least sufficient to react with substantially all the noble metal component present on the catalyst. This corresponds to at least a stoichiometric amount of EDTA relative to the amount of noble metal present on the catalyst, i.e., at least 1:1 for noble metals. An excess of EDTA may be desired to increase the rate of redispersion. This would also allow for the presence of any trace contaminants that would have a formation constant greater than the metal to be dispersed. The upper limit on the amount of EDTA employed is determined by the solubility of EDTA in the treating solution as well as by economic considerations. Either aqueous or non-aqueous treating solutions may be employed although aqueous solutions are preferred.

The volume of treating solution employed should be that sufficient to treat the catalyst to incipient wetness. By "incipient wetness" is meant using sufficient treating solution to thoroughly wet the surface and fill the pores of the catalyst. Since the metal to be redispersed is dissolved by the treating solution, some noble metal would be lost from the catalyst if excess treating solution were present.

During contacting, the noble metal, particularly that portion in the form of large relatively inactive crystallites, is converted substantially completely to metal complexes that are soluble in the treating solution. The treating solution is kept in contact with the catalyst for a period of time sufficient to effect substantially complete redispersion, i.e. distribution of the metal throughout the catalyst. The time required is not critical and may range broadly depending on the concentration of EDTA in the treating solution, the size of the metal agglomerate to be dissolved and the particular temperature employed. Typically, the time will range from about 1 to about 100 hours or more.

The temperature and pressure conditions employed should be such as to maintain the treating solution in the liquid phase. Broadly, this corresponds to a temperature ranging from the freezing point to the normal boiling point of said treating solution. Higher temperatures can be employed under superatmospheric pressure to accelerate the rate of dispersion. However, this may result in increased corrosion of the treating vessel and, as such, is not desirable. Preferably, the redispersion will be effected at ambient temperature and pressure for simplicity and economics. Temperatures below ambient conditions may be employed if desired, but such operations will require refrigeration and, thus, may be uneconomical.

When redispersion of the catalyst has been completed, the catalyst will then be dried, and preferably, subjected to a calcination. Any convenient drying and/or calcination procedure may be employed, such as that used during synthesis of the particular catalyst. Normally, the catalyst will be dried at a temperature above the normal boiling point of the treating solution and, typically, in the range of from about 220° to about 300° F. Drying will normally require from about 1 to about 24 hours or more.

The calcination procedure will basically consist of contacting the crystalline aluminosilicate zeolite-containing catalyst with dry air at high temperatures, by heat-treating the zeolite for a period of from about 1 to 24 hours, preferably 4 to 8 hours, at temperatures of from 300° to 1000° F., and preferably the temperature is increased gradually to 1000° F., while sweeping the catalyst with dry air. The calcination procedure will be carried out in the presence of a treating gas, such as air, nitrogen, inert gases, etc. In addition, calcination may be carried out in a series of stages, with increasing temperatures at each stage for various periods of time. Specifically, this may be done in a series of from two to eight steps, increasing the temperature at increments of from 100° F. to 400° F. until a temperature of from 950° to 1000° F. is finally attained. The calcination serves to remove the carbon, hydrogen and nitrogen present in the EDTA on the catalyst and results in redispersion of the metal in its oxide state. Thus, there is no undesirable residue left remaining on the catalyst such as would normally occur when using mineral acids (e.g. $H_2SO_4$, HCl, etc.) which leave an anion residue on the catalyst that could react with the zeolite. The final catalyst is then cooled and it is ready for use in hydrocarbon conversion processes as described herein.

The present invention may be effected in any convenient apparatus provided the materials of construction are not susceptible to EDTA attack. The EDTA treating can be done in situ if desired, but ex situ operations are usually more convenient.

The following examples are presented to illustrate the process of the present invention and are not intended to unduly restrict the limits of the claims appended hereto.

EXAMPLE 1

Two 200–300 gram samples of spent catalyst from the second stage of a hydrocracker were each placed into a wide mouth jar. The catalysts were then treated with enough diammonium EDTA solution to produce incipient wetness. The concentration was adjusted so as to give two equivalents of EDTA for each equivalent of palladium on the catalysts. This was done by first weighing a small, dry sample of the catalyst. The sample was then weighed after being wetted with water and the amount of water required to wet all the catalyst in the jar was calculated. Knowing the amount of palladium on the catalyst, the amount of EDTA required and the weight of $NH_4OH$ needed to convert the EDTA to the diammonium salt was then calculated. The catalysts were then treated with the solution to incipient wetness. After four days, one example (Sample A), was dried in dry air in a furnace at 300° F. for about 16 hours. Sample A was then calcined by increasing the temperature to 1000° F. over a seven hour period and maintaining that temperature for about 16 hours. After twenty days, the other sample (Sample B) was dried and calcined in like manner. The palladium surface areas were then measured by CO chemisorption. These and other analytical results are summarized in the table below. For comparison purposes data are given on fresh catalyst before any commercial use and on the spent catalyst before treatment with EDTA solution.

TABLE I

| Sample | Faujasite Crystallinity, % | Palladium, Wt. % | Pd Surface Area, m²/g of Pd |
|---|---|---|---|
| Fresh Catalyst | 110 | 0.50 | 312 |
| Spent Catalyst | 78 | 0.50 | 222 |
| Sample A | 70.2 | 0.40 | 301 |
| Sample B | 83.0 | 0.45 | 294 |

These data show that the palladium surface area of the spent catalyst was increased to a value almost equal to fresh catalyst. This was done with only a small loss of palladium metal and no significant change in the crystalline structure of the zeolite base.

EXAMPLE 2

Using the procedure of Example 1, another sample of the same spent catalyst was given a four day treatment. After drying and calcining as above, the catalyst (Sample C) was tested for both first and second stage hydrocracking activity. This was done by placing about 60 cc of the thus treated catalyst into an 80 cc schedule 160 stainless steel pipe having an I.D. of ⅝ inch. A feedstock was then hydrocracked at 1500 psig, with 8000 SCF/B of $H_2$, at a space velocity of 1 V/Hr/V, and at a temperature which was adjusted to give 50% conversion to a product boiling below 400° F. The feedstock has the following characteristics:

sulfur = 23.8 wppm
gravity = 35.6 °API
nitrogen = 1 wppm

FIA analysis, volume % aromatics = 12.2
unsaturates = 1.7
paraffins = 86.1

ASTM D-158 Distillation, ° F.

IBP = 375
5 vol. % = 425
50 vol. % = 507
95 vol. % = 624
FBP vol. % = 637

To simulate first stage hydrocracking operations, the feedstock was spiked with thiophine and butylamine such that there was 10,000 wppm sulfur and 1000 wppm nitrogen. Following the above procedure, another run was made to simulate second stage hydrocracking operations by spiking the feedstock with 3000 wppm sulfur. The results of the tests are shown in the table below.

TABLE II

| Catalyst | Relative Activity, ° F. | |
|---|---|---|
| | First Stage | Second Stage |
| Spent Catalyst | — | Base |
| Sample C | +2 | −7 |

The results show that first stage activity was essentially unchanged but that second stage activity was improved by 7° F. This is the expected result as the treatment should not affect the cracking activity, which controls first stage activity. However, increasing the palladium surface area should increase hydrogenation activity, which controls overall second stage activity.

EXAMPLE 3

Redispersion of palladium by EDTA treatment can be combined with rejuvenation by $NH_4NO_3$ extraction. The spent catalyst was first extracted with $NH_4NO_3$ to improve the cracking activity and then given a two day EDTA treatment by the procedure of Example 1 to improve hydrogenation activity. The palladium surface area is significantly increased by the combined treatment as shown in the table below:

TABLE III

| Sample Description | Pd Surface Area, m²/g of Pd |
|---|---|
| Fresh catalyst | 312 |
| Spent Catalyst | 222 |
| After $NH_4NO_3$ Extraction and Two day EDTA Treatment | 313 |

While the Examples above relate to redispersing palladium on zeolite hydrocracking catalysts, it should be noted that the present invention may be applied to any zeolite containing hydrocarbon conversion which contains a Group VIII noble metal catalyst provided (1) the EDTA can dissolve the catalytic agent or material that one wishes to redisperse and (2) the formation constant of the metal-EDTA complex is greater than that between the EDTA and the support.

What is claimed is:

1. A process for redispersing a noble metal on a supported zeolite-containing hydrocarbon conversion catalyst, at least a portion of said noble metal having become agglomerated, which comprises contacting said agglomerated catalyst with a solution containing at least a stoichiometric amount, based on the amount of noble metal present, of ethylenediaminetetraacetic acid or a salt thereof to incipient wetness for a time sufficient to redisperse a major portion of the metal throughout the catalyst, the temperature and pressure during said contacting being such that said solution is maintained in the liquid phase.

2. The process of claim 1 wherein said salt of ethylenediaminetetraacetic acid is a Group I salt, an ammonium salt, an alkyl ammonium salt, or mixtures thereof.

3. The process of claim 1 wherein said solution is aqueous.

4. The process of claim 1 wherein the catalyst contains from about 0.01 to about 10 wt. % noble metal.

5. The process of claim 4 wherein the noble metal is palladium.

6. The process of claim 1 wherein redispersion is effected at ambient temperature and pressure.

7. The process of claim 1 wherein said salt of ethylenediaminetetraacetic acid is an ammonium salt, an alkyl ammonium salt or mixtures thereof.

8. The process of claim 1 wherein the catalyst is contacted with an oxygen-containing gas at a temperature ranging from about 700° to 1100° F. to burn-off carbon deposited thereon by contact with a hydrocarbon feedstock prior to contact with said solution.

9. A process for redispersing a noble metal on a supported zeolite-containing hydrocarbon conversion catalyst, at least a portion of said noble metal having become agglomerated during contact with an oxygen-containing gas at a temperature ranging from about 700° to 1100° F., which comprises contacting said agglomerated catalyst with a solution containing at least a stoichiometric amount, based on the amount of noble metal present, of ethylenediaminetetraacetic acid or a salt thereof to incipient wetness for a time sufficient to redisperse a major portion of the metal throughout the catalyst, the temperature and pressure during said contacting being such that said solution is maintained in the liquid phase, and thereafter drying the redispersed catalyst.

10. The process of claim 9 wherein said salt of ethylenediaminetetraacetic acid is a Group I salt, an ammonium salt, an alkyl ammonium salt, or mixtures thereof.

11. The process of claim 9 wherein said solution is aqueous.

12. The process of claim 9 wherein the catalyst contains from about 0.01 to about 10 wt. % noble metal.

13. The process of claim 12 wherein the noble metal is palladium.

14. The process of claim 9 wherein redispersion is effected at ambient temperature and pressure.

15. The process of claim 9 wherein said salt of ethylenediaminetetraacetic acid is an ammonium salt, an alkyl ammonium salt or mixtures thereof.

* * * * *